United States Patent
Jacobsen et al.

(10) Patent No.: US 8,741,486 B1
(45) Date of Patent: Jun. 3, 2014

(54) POLYMER MATRIX ENERGY STORAGE DEVICE AND METHOD OF MAKING THE SAME

(75) Inventors: Alan Jacobsen, Los Angeles, CA (US); Ping Liu, Thousand Oaks, CA (US); Kevin W. Kirby, Calabasas Hills, CA (US); Elena Sherman, Culver City, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1075 days.

(21) Appl. No.: 11/368,253

(22) Filed: Mar. 2, 2006

Related U.S. Application Data

(60) Provisional application No. 60/663,451, filed on Mar. 17, 2005.

(51) Int. Cl.
*H01M 4/66* (2006.01)
*H01M 4/62* (2006.01)
*H01M 2/16* (2006.01)

(52) U.S. Cl.
USPC .......................................... 429/236; 429/248

(58) Field of Classification Search
USPC ................. 429/122–347; 29/623.1–623.5
See application file for complete search history.

(56) References Cited

U.S. PATENT DOCUMENTS

| | | |
|---|---|---|
| 5,478,668 A | 12/1995 | Gozdz et al. |
| 5,540,741 A | 7/1996 | Gozdz et al. |
| 5,552,239 A | 9/1996 | Gozdz et al. |
| 5,567,544 A | 10/1996 | Lyman |
| 5,571,634 A | 11/1996 | Gozdz et al. |
| 5,654,114 A * | 8/1997 | Kubota et al. ................. 429/338 |
| 6,194,099 B1 * | 2/2001 | Gernov et al. ................. 429/213 |
| 2003/0049537 A1 | 3/2003 | Wadley et al. |
| 2003/0068559 A1 | 4/2003 | Armstrong et al. |
| 2004/0023114 A1 * | 2/2004 | Sada et al. ................. 429/231.4 |

OTHER PUBLICATIONS

Tarascon et al., Performance of Bellcore's plastic rechargeable Li-ion batteries, Jul. 1996, Solid State Ionics, vol. 86-88, pp. 49-54.*
Tsumura et al., Surface modification of natural grapite particles for lithium ion batteries, Nov. 2000, Soid State Ionics, vol. 135, pp. 209-212.*
Thomas et al.; Multifunction Structure-Battery Materials for Enhanced Performance in Small Unmanned Air Vehicles; Proceedings of IMECE2003: International Mechanical Engineering Congress and R&D Exposition; Nov. 15-21, 2003; Washington, DC; IMECE2003-41512; pp. 1-2; ASME.
Qidwai et al.; Design and Performance of Composite Multifunctional Structure-Battery Materials; 17th American Society for Composites Conference, Paper #141, Oct. 2002, West Lafayette, IN; pp. 1-8.
Christodoulou et al.; Multifunction Material Systems: The First Generation; JOM; pp. 39-45; Dec. 2003.

* cited by examiner

*Primary Examiner* — Jonathan G Leong
(74) *Attorney, Agent, or Firm* — Christopher R. Balzan, Esq.

(57) ABSTRACT

In one embodiment, an energy storage device is provided which includes a cathode and an anode with a separator therebetween. At least one of the cathode or the anode has a rigid polymer matrix with an active material and elongated electrically conducting material having ion conducting moieties bonded thereto within the polymer matrix.

26 Claims, 4 Drawing Sheets

US 8,741,486 B1

POLYMER MATRIX ENERGY STORAGE DEVICE AND METHOD OF MAKING THE SAME

CROSS REFERENCE TO RELATED APPLICATION

This application claims the benefit of U.S. Provisional Application No. 60/663,451, filed on Mar. 17, 2005, by Jacobsen, et al., entitled WIDE RANGE ADAPTABLE POWER STRUCTURES, herein incorporated by reference in its entirety.

BACKGROUND

Energy storage devices, particularly batteries and supercapacitors, are often optimized for a list of performance criteria, such as energy density, power density, cycling life time, etc. Very rarely are these energy storage devices designed and optimized for other criteria as part of the systems they are intended to power, such as weight and volume. To use conventional energy storage devices in a system, they must be packaged, typically in cylindrical or prismatic form, and attached to structural elements. This not only increases the overall weight and volume of the system, but also may comprise the most effective design.

Lithium ion batteries are widely used in consumer products and have also been evaluated for automotive and aerospace applications. The battery chemistries are optimized to deliver the highest energy density, power density, and cycle life with minimum cost. For simplicity, rechargeable lithium ion batteries are used as an example herein, although the description is analogous in supercapacitors and other battery chemistries.

The cross section of a common lithium ion battery bi-cell (based on Bellcore technology) is shown in FIG. 1. A first cathode 110 is composed of an active material 113 ($LiCoO_2$) and an electrically conducting additive 117 (carbon black) held together in a polymer matrix 118 of polyvinylidene difluoride-hexafluoroproplylene (PVDF-HFP). An aluminum grid 115 is sandwiched within the cathode 110. A porous separator 120 composed of a polymer matrix 128 separates the cathode 110 and the anode 130. For the anode 130, graphite is the active material 133, carbon black is the conducting additive 137, and PVDF-HFP is the matrix 138. Sandwiched within the anode is a copper grid 135. A second separator 140 of PVDF-HFP with liquid electrolyte separates the anode 130 and a second cathode 150, which is constructed similar to the first cathode 110.

In forming the battery 100, after the battery 100 components are laminated together, the entire battery 100 is soaked in a liquid electrolyte, such as $LiPF_6$ in ethylene carbonate (EC) and dimethyl carbonate (DMC). The absorbed liquid electrolyte enables ion conduction through the battery. Copper 135 and aluminum grids 115 and 155 act as current collectors for the anode 130 and the cathodes 110 and 150, respectively.

This battery structure, which is similar to other energy storage devices, dictates several shortcomings that greatly impact its integration into a system. Due to its weak structural properties, the battery 100 is usually encased in a metal protective structure, and once encased, the battery 100 has a fixed geometry which often dictates the system design. In summary, batteries, or other energy storage devices, only function as a power supply to a system and often become a limitation for system design.

There is a growing need to have the components of the energy storage device designed to be the mechanical structure, so all or part of an existing structure in a system can be replaced by the energy storage device. This will allow for greater flexibility in the system design while achieving weight and volume savings. Such devices would be applicable to automotive (vehicle accessory power, hybrid vehicles, etc.), military (micro unmanned air vehicles, unmanned air ship, soldier power, etc.), aerospace products (accessory power for sensors, structural sensors for composites, etc.), and consumer items (portable devices, clothing, fabric, etc.), to name only a few.

There have been several attempts to design power elements that can be better integrated into systems while providing added functionality. Qidwal et al., in "Design and Performance of Composite Multifunction Structure-Battery Materials," $17^{th}$ American Society of Composites Conference, Paper #141, October 2002, West Lafayette, Ind., proposed using the aforementioned Bellcore battery technology in more structural geometries, as well as adding additional "inert" layers to improve the battery's structural properties.

The Bellcore battery technology has also been incorporated into the wing of a Micro-UAV, as disclosed by Thomas et al., "Multifunction Structure-Battery Materials for Enhanced Performance in Small Unmanned Air Vehicles," Proceedings of IMECE2003: International Mechanical Engineering Congress and R&D Exposition, Nov. 15-21, 2003, Washington D.C. This design, however, only provides a better distribution of the battery weight rather than saving weight for the total system.

A power fiber concept originally developed by Armstrong et al., disclosed in published U.S. Patent Application 20030068559, Apr. 10, 2003, herein incorporated by reference, employs vacuum deposition techniques to deposit a coaxial thin film battery structure on a fiber which can then be used to fabricate structural composites. Unfortunately, the thin film battery stores very small amounts of energy and the fabrication process is extremely expensive.

P. C. Lyman used layered batteries or supercapacitors in the shape of a honeycomb structure as the core in a typical sandwich structural composite, in U.S. Pat. No. 5,567,544, issued Oct. 22, 1996, herein incorporated by reference. This concept simply replaces the virtually weightless core of a sandwich structure with batteries to space apart the load bearing face sheets. This concept does not attempt to make the energy storage device itself significantly load bearing and is only applicable where the added volume of a sandwich structure is necessary and/or acceptable. In addition, the use of liquid electrolyte in these power elements greatly limits the application temperature and structure.

Wadley et al., in published U.S. Patent Application 20030049537, published Mar. 13, 2003, have also worked on developing a structural battery by including the necessary active components of a battery within a porous metallic structure which would be the load bearing element. Similar to the work done by Lyman, this concept also relies on a liquid electrolyte.

Thus, what is needed is an inexpensive mechanically robust composite from the battery components without the need for additional structural elements. Also, there is a need to provide a means to monitor the health status of the structure. Current technology requires additional sensors to achieve this level of functionality.

SUMMARY

In one embodiment, an energy storage device is provided which includes a cathode and an anode with a separator therebetween. At least one of the cathode or the anode has a rigid polymer matrix with an active material and elongated electrically conducting material having ion conducting moieties bonded thereto within the polymer matrix.

BRIEF DESCRIPTION OF THE DRAWINGS

The features and advantages of the present invention will be better understood with regard to the following description, appended claims, and accompanying drawings where:

DESCRIPTION

Certain embodiments of this invention enable the fabrication of multi-functional power structures, such as batteries or supercapacitors, which can also function as structural members, allow structural deformation, and/or provide sensor capabilities.

By varying the matrix type of the storage device, the structural properties of the device can be changed.

Mechanically Robust Power Storage Devices

FIGS. 2-3

Conventional batteries are weak composites, not very useful as structural components. Their chemistry and materials are optimized for energy storage and not for structural support. More robust materials, typically do not facilitate sufficient ion conductivity to be useful where large amounts of storage capacity are required.

Figure 1:
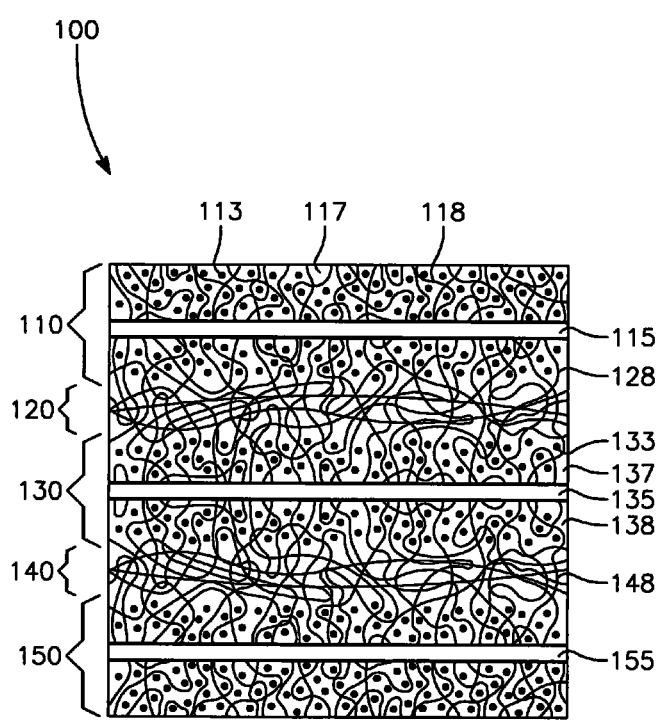
FIG. 1 is a simplified cross section of a common lithium ion battery.
Figure 2:
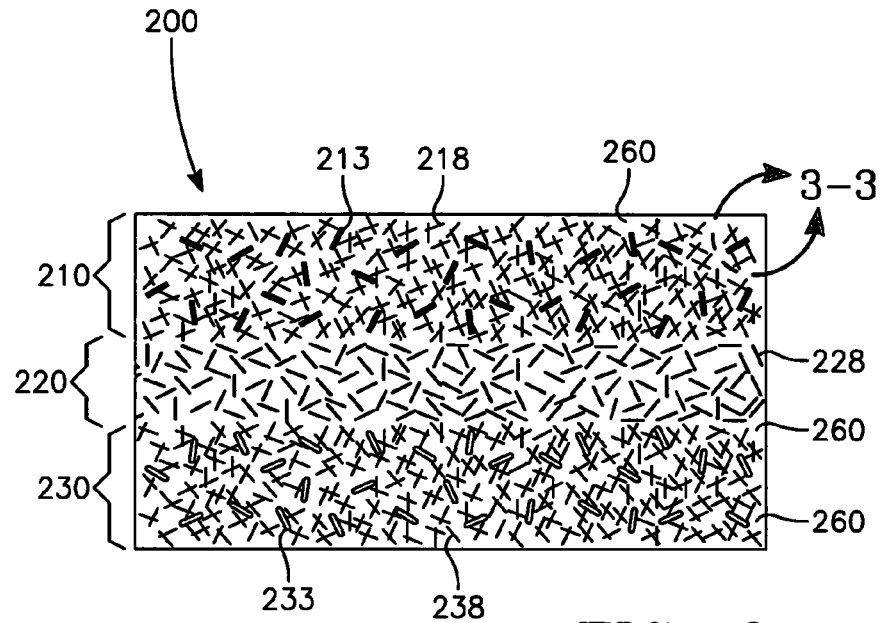
FIG. 2 shows a cut away side view of a battery 200 in accordance with one possible embodiment of the present invention.

FIG. 2 shows a cut away side view of a battery 200 in accordance with one possible embodiment of the present invention. The battery 200 includes a cathode 210 and an anode 230 separated by a separator 220. The separator allows ion flow but is electrically non-conductive.

In this embodiment, a polymer matrix 260 is selected that enables the energy storage device to perform the necessary structural function for a given system. This may be a rigid, elastic, or shape-memory polymer depending on the application. Additionally, the polymer needs to possess the other properties necessary for implementation in a battery, such as: ionic conductivity when soaked with liquid electrolyte or blended with solid electrolyte; electrochemical stability when in contact with the anode active material 233 and cathode active material 213 respectively; and ease of processing. This polymer 260 can be either a thermoplastic or thermoset. In some embodiments, various forms of polyvinylidene fluoride (PVDF) will be used due to its known compatibility in the battery environment. For a rigid device, a high molecular weight PVDF can be used because of its mechanical strength and stiffness, and for an elastic device, the copolymer polyvinylidene difluoride-tetrafluoroethylene-propylene (PVDF-TFE-P) can be used due to its ability to crosslink providing elastomer-like properties. Also, a shape memory polymer form of PVDF can be used to form a shape memory energy storage device or a device that may be easily formed into specific shape in a heated state, and then cooled to retain that shape.

The shape and structure of the materials of the cathode 213 and the anode 233 are selected to assist with mechanical requirements of the necessary structure for a given system. Conventional Li-ion batteries have a weak polymer matrix composite with spheroidal fillers. For a rigid energy storage device 200 shown in FIG. 2, the spheroidal fillers are replaced with fibers, ribbons, tubes, chains, or other high aspect ratio shapes of the same or similar materials to provide mechanical reinforcement. Thus, the cathode active material 213 and anode active material 233 are elongated particles. Similarly, the cathode electrically conducting material 218 and the anode electrically conducting material 238 are elongated particles, which may be carbon, metal, or the like, which may be nanoscale. In addition, elongated electrically insulating particles 228, such as glass fibers, non-electrically conducting polymers, ceramic, or the like, may be provided in the separator 220. Thus, in certain embodiments, the end result will be an energy storage device that is a reinforced structural composite.

For the case of a Li-ion battery, the cathode active material 213 can be selected from $LiMM'O_2$ (M=Co, Ni, Mn; M'=Co, Ni, Mn, Al Fe, etc.), $LiMO_x$ (M=V, Mn, Ti, W, etc., x=1 to 3), or lithium metal sulfide (e.g., $LiTiS_2$, $LiMoS_3$, etc.). The anode active material 233 may be selected from carbon (both graphitic and non-graphitic) or metals that can form an alloy with lithium such as Sn, Al, Si, etc.

For an elastic or shape memory device, materials of the cathode 210 and the anode 230 can take other forms that help meet the end mechanical requirements. Thus, in some elastic battery embodiments spheroidal active material particles and spheroidal conductive material particles may be possible in the cathode 210 and anode 230.

In certain embodiments of the present invention, liquid electrolyte is replaced with a solid polymer electrolyte that will provide sufficient ionic conductivity while not substantially degrading the mechanical performance of the energy storage device. This concept will be realized by either chemically modifying the surface of filler particles with functional groups capable of ion conduction, or forming a structural polymer that is ionically conductive.

Figure 3:
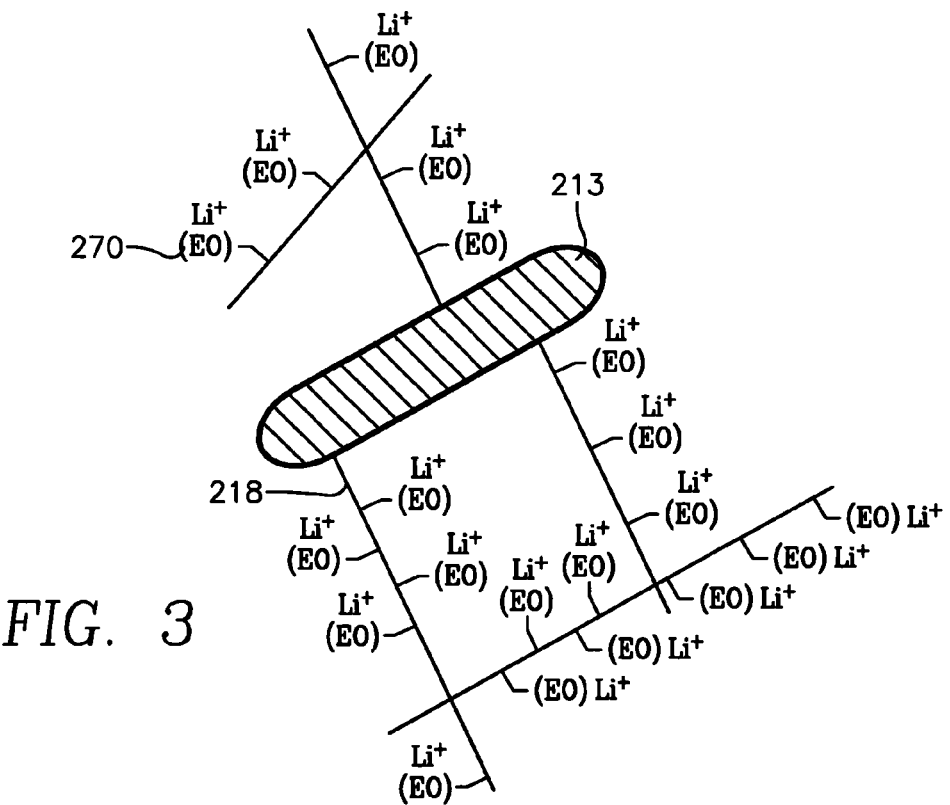
FIG. 3 shows an exploded view taken along the 3-3 line of FIG. 2.

Turning to FIG. 3, shown is an exploded view taken along the 3-3 line of FIG. 2. In this example embodiment, the conductive additive 218 and 238 in the cathode 210 and anode 230 may be carbon nanofibers. Ion conducting moieties 270 are chemically bonded to the surface of the nanofibers. Shown in FIG. 3, ethylene oxide (EO) end groups are chemically bonded to the surfaces of the conducting material 218. Other examples are ploy[bis-(2-(2-methoxyethoxy)ethoxy)phosphazene], poly(propylene oxide), poly(oxymethylene-oligo-oxyethylene), or the like This chemical modification may be done to the active materials 213 and 233 as well. Thus, ion conducting groups may be chemically bonded to the cathode active material 213 and/or the anode conductive material 233, instead of, or in addition to the cathode conducting material 218 and/or the anode conducting material 238. Similarly, the glass fibers 228 of the separator 220 may have ion conducting moieties bonded, such as ethylene oxide, to provide ion conductivity.

Poly(ethylene oxide), when bonded to the nanofiber 218 or 238 becomes a solid lithium ion conductor. In general, a very low molecular weight moiety can provide better ion conduction than larger weight moieties. Thus, ionic conductivity may be maintained while significantly improving the mechanical properties of storage devices. In embodiments where the electrolyte is chemically bonded to particles, the particles should be in contact with each other to provide efficient electrical conductivity path.

Embodiments of the present invention are not limited to lithium ion batteries. The same material design approach can be applied to other batteries. A few examples include zinc-air and nickel-metal hydride batteries. The operation of zinc air batteries, for example, involves the oxidation of metallic zinc by the oxygen available in air. A mechanically robust polymer, either rigid or elastic or shape-memory, that is capable of conducting hydroxyl ions could be present in the zinc anode (in other words zinc is embedded in the polymer). On the other side of the polymer where zinc is not present, there is a painted, carbon supported, platinum catalyst layer which serves as the air cathode. This whole battery is thus rendered structural by the polymer electrolyte layer.

In other embodiments, structural supercapacitors are possible. Electrochemical supercapacitors based on carbon or metal oxides also have cell structures very similar to lithium ion batteries. In one example supercapacitor embodiment, the electrodes may be formed of continuous or discontinuous, carbon nanofibers, nanotubes, ribbons, or other elongated particles, rather than conventional high surface area activated carbon. The material of the polymer binder is selected so as to provide the desired mechanical properties.

Sensing and Structural Health Monitoring

FIGS. 4A-5B

Figure 4A:
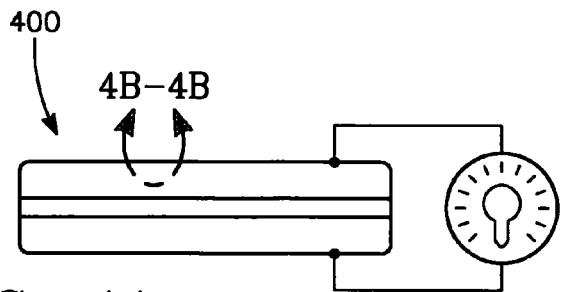
FIG. 4A illustrates a side view of a potential battery-sensor embodiment without physical deformation.
Figure 5A:
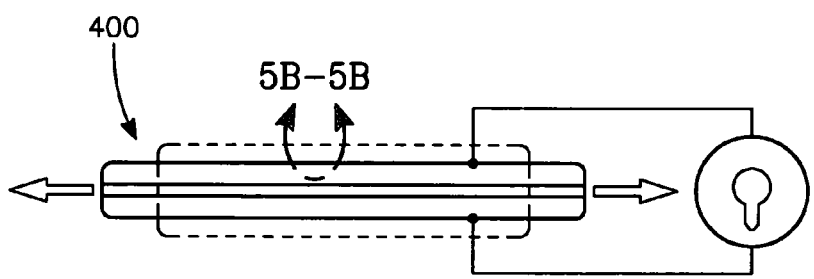
FIG. 5A illustrates a side view of a potential battery-sensor embodiment with physical deformation.

FIG. 4A illustrates a battery 400 without physical deformation and FIG. 5A illustrates a battery 400 under physical deformation. In energy storage devices, conducting additives such as carbon black particles, or carbon fibers are added to the anode and cathode to maintain electrical conduction between active materials. The amount of the conducting additive is also controlled so that even under elastic extension the electrical conductivity will not decrease. If the amount of conducting additive is controlled at the conducting threshold, the resistance of the electrodes will increase when the battery is under a tensile load, as illustrated in FIG. 5A, and thus the battery output will be sacrificed.

Figure 4B:
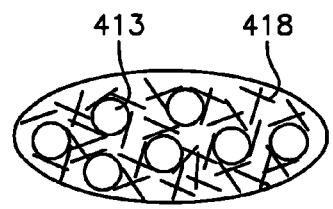
FIG. 4B is an exploded view taken along the 4B-4B line of FIG. 4A.
Figure 5B:
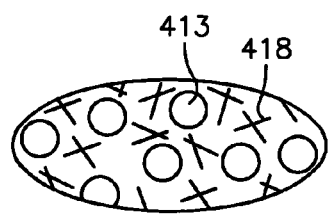
FIG. 5B is an exploded view taken along the 5B-5B line of FIG. 5A.

FIG. 4B is an exploded view taken along the 4B-4B line of FIG. 4A. FIG. 5B is an exploded view taken along the 5B-5B line of FIG. 5A. If the amount of conducting material 418 is controlled, so that the amount of conducting material 418 is at or near its percolation threshold, physical deformation will cause the electrical conducting particles 418 and active material particles 413 to separate from each other. This not only reduces the resistivity of the device 400, it also reduces the ability of the battery to provide its stored energy. Therefore, there will be a significant reduction of the voltage across the battery 400 in response.

This battery response to strain forms the basis for structural heath monitoring when the battery 400 forms part of a structural component, or embedded in a structure. Even in its simplest form, the energy storage devices may act as a damage detection device. Electrically isolated batteries or supercapacitors, may be strategically placed within a structure, and if there is local damage in the structure the performance of the energy storage device in that region will be greatly affected. This could provide a warning for a necessary shutdown, inspection, or other corrective actions.

The battery-sensor may be formed of elastic and/or rigid construction depending on the application.

An advantage of the battery-sensor(s) is that the sensor is self powered as opposed to conventional sensors. Thus, traditional power losses associated with power delivery to sensors can be avoided.

Example Methods of Fabrication of Example Embodiments

Functionalization of CNF with PEG Using a Three-Step Procedure

In one example implementation, the functionalization of carbon nanofibers or CNF, with polyethyleneglycol or PEG, yields the solid lithium ion conductor discussed above. This may be completed in a three-step procedure as follows. Into a 500 ml round bottom flask CNFs (8 g) were placed with 4-aminobenzoic acid (0.329 g) in $H_2O$ (180 g)+$HNO_3$ (0.36 g) and isopropyl alcohol (25 ml). $NaNO_2$ (0.18 g) in $H_2O$ (4 g) were added slowly dropwise to the reactants. The reaction was stirred at 70° C. for 2 hours. The CNFs were filtered and further washed with water. The CNFs were dried at 100° C. for 10 hrs. The carboxylic acid groups were converted into acid chlorides. Into a 250 ml round bottom flask CNF-benzoic acid (3 g) was placed with thionyl chloride (50 ml). The reaction was allowed to reflux for 24 hours. After the slurry cools off, thionyl chloride was removed by filtration, followed by washing with anhydrous THF. The product was allowed to dry. The esterification reaction was performed between CNF-benzoyl chloride and PEG. Into a 250 ml round bottom flask CNF-benzoyl chloride (1 g) was placed with PEG (1.35 g, molecular weight=2000) in pyridine (30 ml). The reaction was stirred at 70° C. for 16 hours under a nitrogen atmosphere. The product was filtered and washed with water to remove pyridine. The CNF-PEG are further cleaned using methanol soxhlet extraction.

Fabrication of Rigid Li-Ion Battery Components

In one example implementation, a rigid lithium-ion battery anode, cathode, and separator were fabricated using a high molecular weight PVDF ($M_w$=534,000) as the matrix material. The anode and cathode were made by mixing 45 wt % PVDF powder with 45 wt % of their respective active materials and 10 wt % CNF-PEG (electrically and ion conducting additive), and then hot pressed at 200 C to melt the PVDF and form a continuous polymer matrix. The separator was fabricated by mixing 98 wt % of the same PVDF powder and 2 wt % fumed silica, and then hot pressing the mixture again to form a continuous matrix. The fumed silica was added to the separator to insure porosity for electrolyte absorption.

Fabrication of Elastic Battery Components

In one example implementation the cathode was formed by combining 20 wt % PVDF-TFE-P in methyl ethyl ketone or MEK, $LiCoO_2$, and carbon black are combined in blender jar while mixing. Mixing was continued for 40 minutes, then 4% CaO, 3% 1,4-diazabicyclo[2.2.2]octane (DABCO) and 5% triethylenetetramine (TETA) was added. This was mixed for an additional 16 min. The mixture was cast on Teflon sheet and dried in air overnight. Small piece of electrode was heated at 110 C in Argon for 6 hrs to increase the density of crosslinking. The film thickness is ~4.5 mil.

To form the anode, in blender jar 20 wt % PVDF-TFE-P in MEK, Graphite and 5% carbon black were combined while mixing. After continuing to mix for 40 min, 4% CaO, 3% DABCO and 5% TETA were added. This was mixed for an additional 15 min. The mixture was cast on Teflon sheet and dried in air overnight. A small piece of electrode was heated at 110 C in Ar for 6 hrs. The film thickness was ~4.0 mil.

To form the separator, 20 wt % BRE-7131X in MEK, 4% CaO, 3% DABCO and 5% TETA were combined in blender jar while mixing. Fumed silica (Cabosil TS-530) and propylene carbonate were added to increase porosity in separator film. The mixture was cast on silanized Mylar and dried in air overnight. The film was heated at 110 C in Ar for 6 hrs. The film thickness was –5.5 mil.

Mechanical Comparison of Conventional Battery Components and Example Embodiments

FIGS. 6-7B

Figure 6:
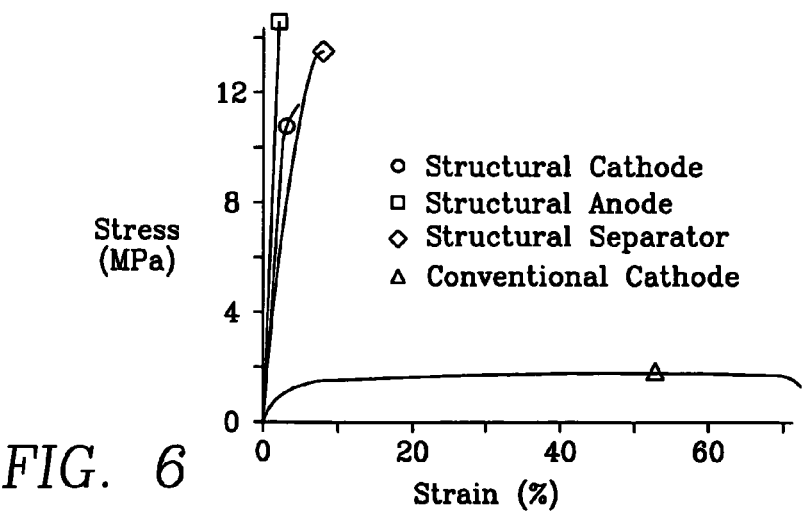
FIG. 6 is a graph showing a comparison of quasi-static tensile tests of a Bellcore battery cathode, and an example embodiment of the rigid battery components.

FIG. 6 is a graph showing a comparison of quasi-static tensile tests of a Bellcore battery cathode and an example embodiment of the rigid battery components. The above example Bellcore battery cathode was tested in a quasi-static tensile tests (displacement rate of 1 mm/min) along with the rigid battery components described. The dimensions of the rigid anode, cathode, and separator were approximately t=0.5 mm, w=5.3 mm, l=22 mm, and the dimensions of the Bellcore technology cathode was t=0.08 mm, w=5.3 mm, l=22 mm.

FIG. 6 shows there is a dramatic improvement in the strength and stiffness of these components in comparison to a conventional cathode. The stress in MPa verses percent strain are on the order of 10 MPa or greater for each of the cathode, anode and separator, as compared to 2 MPa or less for the conventional Bellcore cathode.

Figure 7A:
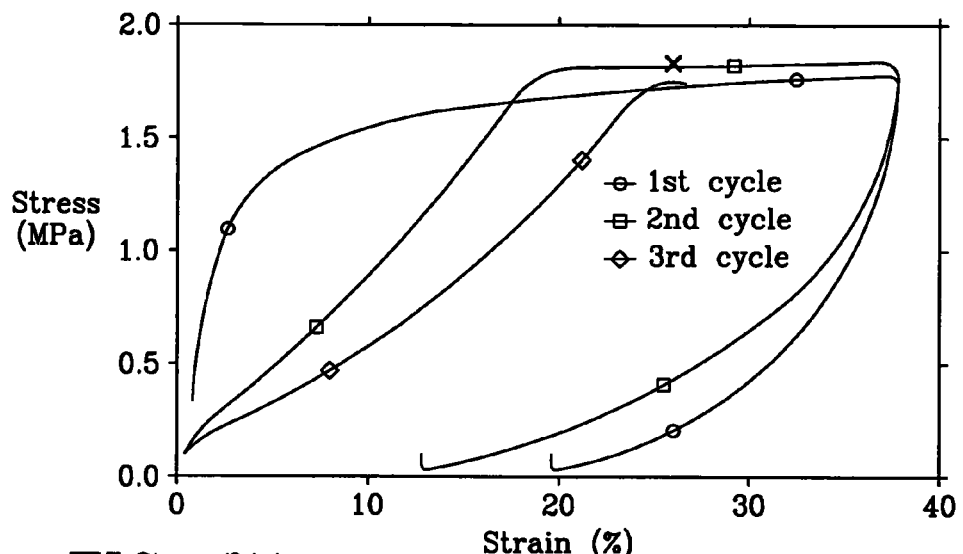
FIG. 7A is a graph showing stress verses percent strain cycling data for a conventional Bellcore technology cathode.

FIG. 7A is a graph showing stress verses percent strain cycling data for a conventional Bellcore technology cathode. The elastic cathode and a conventional Bellcore cathode were cycled three times between a tensile stain of 0% and 40% in an Instron testing machine. The displacement rate for each cathode was 5 mm/min. The sample size of the elastic and Bellcore cathodes were t=0.08 mm, w=5.3 mm, l=22 mm. After the first cycle the elastic cathode was able to recover the strain where the Bellcore cathode plastically deformed and broke on the third cycle. See FIG. 7A and FIG. 7B for a comparison of this data.

Figure 7B:
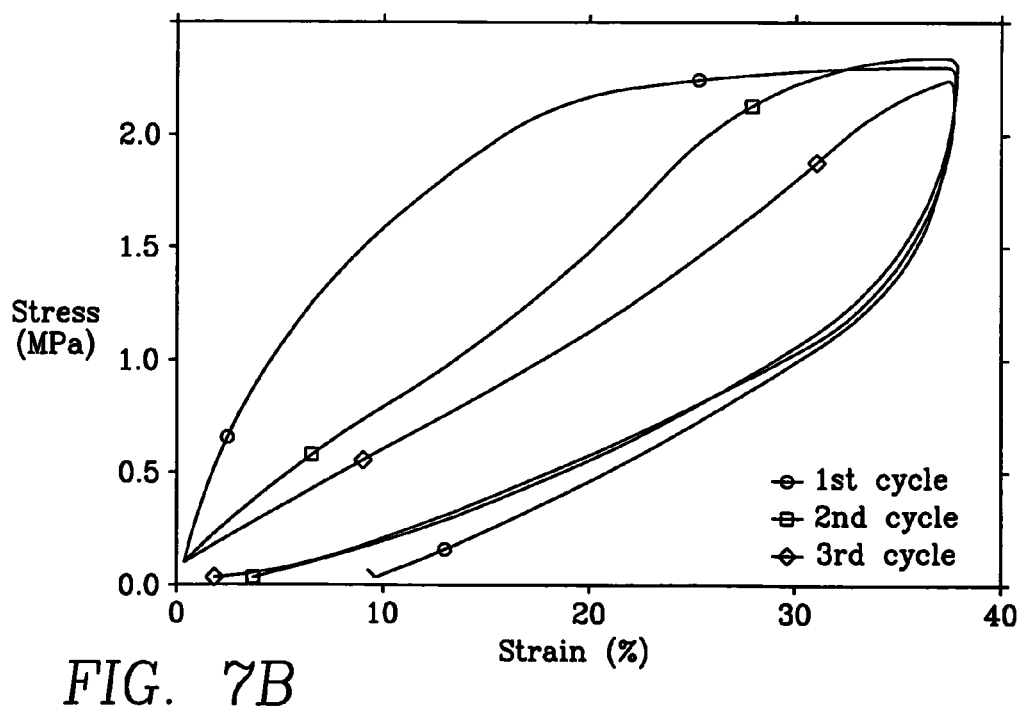
FIG. 7B is a graph showing stress verses percent strain cycling data for an elastic cathode in accordance with one embodiment of the present invention.

FIG. 7B is a graph showing stress verses percent strain cycling data for an elastic cathode in accordance with one embodiment of the present invention. The elastic cathode completed three cycles without breaking.

Having described this invention in connection with a number of implementations and embodiments, modification will now certainly suggest itself to those skilled in the art. The invention is not intended to be limited to the disclosed implementations and embodiments, except as required by the appended claims.

What is claimed is:

1. An energy storage device comprising:
a) a cathode and an anode with a separator therebetween; and
b) at least one of the cathode or the anode comprising:
i) a rigid polymer matrix; and
ii) an active material within the rigid polymer matrix;
iii) elongated electrically conducting particles comprising ion conducting moieties bonded thereto;
iv) wherein the elongated electrically conducting particles comprising the ion conduction moieties are located within the rigid polymer matrix and bonded to the polymer matrix so as to provide mechanical reinforcement therewith;
v) wherein the rigid polymer matrix comprises a solid electrolyte; and
c) wherein the separator comprises elongated electrically insulated particles comprising ion conducting moieties bonded thereto, the elongated electrically insulated particles being mixed throughout the separator.

2. The device of claim 1 wherein the active material comprises lithium.

3. The device of claim 2 wherein the elongated conducting particles comprise carbon.

4. The device of claim 3 wherein the moieties comprise ethylene oxide.

5. The device of claim 4 wherein the rigid polymer matrix comprises one of: (a) a thermoplastic, or (b) a thermoset.

6. The device of claim 5 wherein the rigid polymer matrix comprises polyvinylidene fluoride.

7. The device of claim 6 wherein the rigid polymer comprises a high molecular weight polyvinylidene fluoride.

8. The device of claim 1 wherein the rigid polymer matrix comprises one of: (a) a thermoplastic, or (b) a thermoset.

9. The device of claim 8 wherein the rigid polymer matrix comprises polyvinylidene fluoride.

10. The device of claim 9 wherein the rigid polymer comprises a high molecular weight polyvinylidene fluoride.

11. The device of claim 1 wherein the elongated particles of the cathode comprise at least one of: (a) fibers, (b) tubes; (c) chains, or (d) ribbons.

12. The device of claim 1 wherein the elongated particles of the cathode comprise at least one of: (a) carbon fibers, or (b) carbon nanotubes.

13. The device of claim 1 wherein the active material of the cathode comprises one of: (a) $LiMM'O_2$ where M is one of Co, Ni, or Mn and wherein M' is one of Co, Ni, Mn, Al, Fe, or other metal; (b) $LiMO_x$ where M is one of V, Mn, Ti, or W and where x is one of 1, 2, or 3; or (c) $LiMS_x$ where M is one of Ti, or Mo and x is one of 2 or 3.

14. The device of claim 1 wherein the active material of the cathode comprises $LiCoO_2$.

15. The device of claim 1 wherein the anode comprises one of: a carbon comprising material or lithium alloys.

16. The device of claim 1 wherein the moieties comprise an ion conducting polymer.

17. The device of claim 16 wherein the moieties comprise ethylene oxide.

18. The device of claim 1 wherein the separator comprises glass fibers.

19. The device of claim 18 wherein the glass fiber further comprise ion conducting moieties bonded thereto.

20. A reinforced polymer composite energy storage device comprising:
a) a cathode and an anode with a separator therebetween; and
b) at least one of the cathode or the anode comprising:
i) a rigid polymer matrix; and
ii) elongated particles within the rigid polymer matrix bonded to the rigid polymer matrix so as to provide mechanical reinforcement therewithin, the elongated particles comprising at least one of: (1) elongated active material particles; and (2) electrically conducting elongated particles; and
c) wherein the separator comprises elongated electrically insulating particles comprising ion conducting moieties bonded thereto, the elongated electrically insulating particles comprising the ion conducting moieties bonded thereto being mixed throughout the separator.

21. The device of claim 20 further comprising ion conducting moieties bonded to at least one of: a) the elongated active material particles; and b) the electrically conducting elongated particles.

22. The device of claim 20 wherein the rigid polymer matrix comprises an ionic conductive copolymer.

23. An energy storage device comprising:
 a) a rigid polymer matrix comprising a cathode and an anode with a separator therebetween;
 b) the cathode comprising elongated electrically conducting particles within the rigid polymer matrix comprising ion conducting moieties bonded thereto;
 c) the anode comprising elongated electrically conducting particles within the rigid polymer matrix comprising ion conducting moieties bonded thereto; and
 e) the separator comprising elongated electrically insulated particles comprising ion conducting moieties bonded thereto, wherein the elongated electrically insulating particles comprising the ion conducting moieties bonded thereto are mixed throughout the separator.

24. A method for forming an energy storage device comprising:
 a) forming solid polymer matrix comprising a cathode, an anode, and a separator;
 b) forming a solid electrolyte material comprising bonding a chemical moiety to a conductive particle of at least one of: (a) a cathode active material; or (b) an anode active material; and
 c) locating the solid electrolyte material within the solid polymer matrix so as to be capable of providing mechanical reinforcement therewith; and
 d) mixing elongated electrically insulated particles comprising ion conducting moieties bonded thereto throughout the separator.

25. The method of claim 24 wherein forming a solid electrolyte material comprises bonding the chemical moiety to an elongated conductive particle.

26. The device of claim 1, wherein the energy storage device is a reinforced structural composite.

* * * * *